United States Patent [19]

Kotani et al.

[11] Patent Number: 5,498,664

[45] Date of Patent: Mar. 12, 1996

[54] METHOD FOR COMPATIBILIZING RESINS WITH EACH OTHER AND RESIN COMPOSITION COMPRISING RESINS COMPATIBILIZED WITH EACH OTHER, OBTAINED BY SAID METHOD

[75] Inventors: Kozo Kotani, Toyonaka; Toshio Kawakita, Ibaraki; Taiichi Sakaya, Takatsuki; Ryuma Kuroda, Ibaraki, all of Japan

[73] Assignee: Sumitomo Chemical Company, Limited, Osaka, Japan

[21] Appl. No.: 132,899

[22] Filed: Oct. 7, 1993

[30] Foreign Application Priority Data

Oct. 8, 1992 [JP] Japan .................................. 4-270086

[51] Int. Cl.⁶ .............................. C08L 29/02; C08L 29/04
[52] U.S. Cl. .................... 525/56; 525/57; 525/61; 525/326.1
[58] Field of Search .................... 525/56, 57, 61, 525/326.1

[56] References Cited

U.S. PATENT DOCUMENTS 4,444,817 4/1984 Subramanian .
4,485,139 4/1984 Watanabe et al. ....................... 428/219
4,600,739 7/1986 Krankkala ................................. 524/48
4,937,284 6/1990 Bergstrom .

FOREIGN PATENT DOCUMENTS 152180   8/1985  European Pat. Off. .
187040   9/1986  European Pat. Off. .
2316259  1/1977  France .
1950479  5/1970  Germany .
50-58188 5/1975  Japan .
63-108016 5/1988 Japan .
829634   2/1957  United Kingdom .

OTHER PUBLICATIONS

Chemical Abstracts, vol. 87, Abstract No. 136861 (1987).

*Primary Examiner*—W. Robinson H. Clark
*Attorney, Agent, or Firm*—Cushman Darby & Cushman

[57] ABSTRACT

A method for compatibilizing at least two thermoplastic resins each having hydroxyl group(s), with each other, which method comprises reacting at least one of the thermoplastic resins with a boron compound simultaneously with or before mixing of the resins, to form a boric acid ester at least at the boundary of the resins; a resin composition comprising resins compatibilized with each other, obtained by the method; and a laminate whose at least one layer consists of the resin composition.

9 Claims, No Drawings

METHOD FOR COMPATIBILIZING RESINS WITH EACH OTHER AND RESIN COMPOSITION COMPRISING RESINS COMPATIBILIZED WITH EACH OTHER, OBTAINED BY SAID METHOD

BACKGROUND OF THE INVENTION

1. Field of the Invention

The present invention relates to a resin composition as a polymer blend which comprises a graft polymer and which has higher compatibility between the component resins and higher performance, as well as to a method for compatibilizing different resins with each other to obtain said resin composition. Said resin composition can be used as a polymer blend capable of responding to diversified requirements for polymer materials, such as higher processability, higher heat resistance, higher impact resistance, higher gas barrier property and the like.

2. Description of the Related Art

Polymer blends each comprising different polymers having different properties have been used for performance improvement of polymer material. Of them, a composition comprising a graft polymer (obtained by chemically bonding two components contained therein), has improved adhesivity and compatibility between the two components and has been used for further performance improvement.

The method for producing a resin composition comprising a graft polymer can be largely divided into two methods. The first method is a method comprising polymerization. It includes a method in which graft reaction sites are introduced during polymer production as seen in the case of maleic anhydride copolymer or macromolecular monomer, and a method in which monomer polymerization is conducted in the presence of a trunk polymer [e.g. Japanese Patent Application Kokai (Laid-Open) No. 58188/1975 and Japanese Patent Application Kokai (Laid-Open) No. 108016/1988].

The second method is a method comprising no polymerization, wherein graft reaction sites are introduced into a polymer having no graft reaction site, in a post-reaction and grafting is conducted between the resulting polymer and a different polymer. It includes a method described in Japanese Patent Application Kokai (Laid-Open) No. 155412/1986 (U.S. Pat. No. 4,937,284), etc., which comprises reacting a resin with a peroxide or the like to generate a radical in the resin molecule, reacting the radical with a silane coupling agent to form a graft reaction site, and melt-kneading the resulting resin with other resin to achieve grafting between the two resins.

The second method, as compared with the first method, has advantages that the resins to be subjected to grafting can be selected from many kinds of resins and the whole procedure can be carried out in an extruder. The second method, however, has had a drawback that since the radical introduction into trunk polymer is essential, undesirable irreversible side reactions (e.g. crosslinking, decomposition, etc. of polymer) take place simultaneously with the radical introduction, making impossible the introduction of graft reaction sites in sufficient degree.

Thus, the conventional methods have had problems that a special polymerization method or a copolymer resin of a special component must be used in order to obtain high compatibility and that use of general-purpose resins results in low compatibility.

SUMMARY OF THE INVENTION

The present invention is intended to provide a method for making different resins highly compatible with each other, which method can be widely applicable to general-purpose resins.

The present inventors made extensive study on various methods for compatibilizing thermoplastic resins each having hydroxyl group(s), with each other. The study was made with attention paid to the fact that the ester bond between hydroxyl group and boric acid can diffuse through resins. As a result, it was found that introduction of said ester bond into one thermoplastic resin having hydroxyl group(s) and subsequent contact of the resulting resin with other thermoplastic resin having hydroxyl group(s) results in (1) bonding of the two resins via boric acid ester at the boundary of the two resins and (2) significantly improved compatibility between the two resins. The finding has led to the completion of the present invention.

The present invention relates to a method for compatibilizing thermoplastic resins each having hydroxyl group(s), with each other by the use of a boron compound, as well as to a resin composition obtained by said method, comprising a graft polymer formed via boric acid ester bond between the two component thermoplastic resins contained in the composition and each having hydroxyl group(s).

More particularly, the present invention relates to a method for compatibilizing at least two thermoplastic resins each having hydroxyl group(s), with each other, which method comprises reacting at least one of said thermoplastic resins with a boron compound simultaneously with or before mixing of said resins, to form a boric acid ester at least at the boundary of said resins, as well as to a resin composition comprising resins compatibilized with each other, obtained by said method.

The present invention is widely applicable to ordinary general-purpose resins. It is applicable not only to resins each having hydroxyl group(s) in the molecule or at the molecular chain end(s) but also to resins into which hydroxyl group(s) can be introduced by a chemical treatment such as hydrolysis, saponification or the like. (Specific examples of these resins are mentioned later.)

The biggest feature of the present invention lies in effective compatibilization of wide-use polymers with each other. Unlike those resins (e.g. maleic anhydride copolymer) having graft reaction sites introduced at resin production step, any resins having functional group(s) capable of forming a boric acid ester by any means can be used as the material resins of the present invention. Even a copolymer containing a small amount (5% by weight) of vinyl acetate as a comonomer, as used in Examples, can easily become a material resin for compatibilization when said copolymer is saponified to introduce hydroxyl group(s) thereinto. Since the boric acid-induced crosslinking reaction is a quantitative reaction, there seldom occurs, in the reaction, a problem caused by an insufficient number of graft reaction sites, such as seen in the case of radical formation by peroxide or the like.

The application of a somewhat general method of introducing graft reaction sites by the use of a silane coupling agent [said method is disclosed in Japanese Patent Application Kokai (Laid-Open) No. 155412/1986 (U.S. Pat. No. 4,937,284)] to a highly hygroscopic resin having hydroxyl group(s), has had a problem that unless the resin is dried sufficiently, the coupling agent causes a reaction between the silanol groups owing to the water present in the resin, making it impossible to produce a product having sufficient compatibility. Meanwhile, the reaction of the present invention via boric acid ester, which is reversible in the presence of water, proceeds satisfactorily by removing water during the reaction.

The method for compatibilization of resins according to the present invention is described in detail below.

The material resins used in the present invention are at least two thermoplastic resins each having hydroxyl group(s). The material resins may comprise other resin(s) as long as the other resin(s) do not impair the compatibilization intended by the present invention.

In the present invention, the compatibilization for two resins (hereinafter referred to polymers A and B) is largely divided into two steps.

One is a step in which the polymer A is reacted with a boron compound to convert it into a boric acid-esterified polymer A (this step is hereinafter referred to as first step). The other is a step in which the boric acid-esterified polymer A is blended with the polymer B to achieve grafting between the two polymers (this latter step is hereinafter referred to as second step).

The reason why the compatibilization is conducted in two steps, is that in the course of diffusion of boric acid ester from polymer A into polymer B, a graft polymer is formed efficiently at the boundary of the polymer A and the polymer B. The two steps need not be conducted separately as long as sufficient grafting is obtained. For example, the polymer A, the polymer B and a boron compound may be blended together.

Each step is described in detail below.

The reaction vessel used in the first step of the present invention has no particular restriction. It may be a biaxial extruder for reaction as used in Examples, which enables heat-kneading of polymer with continuous addition of boron compound, or a kettle when the viscosity increase caused by boric acid ester-induced crosslinking is a problem.

In the present invention, the temperature employed in the first step has no particular restriction as long as it enables infiltration of boron compound into polymer and occurrence of estrification. However, in order to allow said reaction to proceed satisfactorily, the temperature is preferably lower than the boiling point or decomposition point of the boron compound and higher than the boiling points of the by-products generated in the ester exchange reaction.

For example, when boric acid or a boric acid solution is used at 1 atm, the temperature employed in the first step is 100°–300° C. because the boiling point of water generated in the ester exchange reaction is 100° C. and the decomposition point of boric acid is 300° C.; when butyl borate is used, the temperature is 118°–230° C. because the boiling point of butyl alcohol generated in the ester exchange reaction is 118° C. and the boiling point of butyl borate is 230° C. Thus, the temperature of the first step is preferably higher than the boiling point of water or butyl alcohol generated in the ester exchange reaction, for easy removal of the water or butyl alcohol, and lower than the decomposition point or boiling point of the boron compound. It is further preferable from the standpoint of rapid reaction that the polymer to be reacted be plasticized in the temperature range used in the first step.

In the present invention, the reaction time employed in the first step is not particularly restricted, but is preferably such as to enable the uniform diffusion of boron compound into polymer A and sufficient formation of ester bond.

In the present invention, the reaction vessel used in the second step has no particular restriction, but is preferably a kneader enabling strong kneading, such as biaxial extruder or the like so that the boric acid ester-crosslinked polymer A obtained in the first step can be kneaded sufficiently.

In the present invention, the reaction temperature employed in the second step has no particular restriction but, as in the first step, is preferably higher than the boiling points of the by-products generated in the ester exchange reaction, in order to allow the reaction to proceed satisfactorily.

In the present invention, the reaction time employed in the second step has no particular restriction. However, the reaction of the second step is preferably stopped when the two polymers have the highest compatibility before the diffusion of boric acid ester has reached an equilibrium and before substantially the whole portion of boric acid ester has moved from inside the polymer A into the polymer B.

Such an optimum reaction time differs depending upon various factors such as the kinds of polymers to be compatibilized, the amount of boric acid ester introduced, kneading conditions and the like. The optimum reaction time can be appropriately determined by morphology observation using a microscope, light scattering or the like, viscoelasticity measurement, thermal analysis, etc.

The polymers A and B used as the material resins in the present invention have no particular restrictions as long as they are thermoplastic resins each having hydroxyl group(s) in the molecule or at the molecular end(s), or resins into which hydroxyl group(s) can be introduced by a chemical treatment.

As the polymers A and B, there can be used, for example, vinyl alcohol resins such as polyvinyl alcohol, ethylene-vinyl alcohol copolymer and the like; vinyl acetate resins such as polyvinyl acetate, ethylene-vinyl acetate copolymer and the like; polysaccharide plastics such as starch, nitrocellulose, acetylcellulose, cellulose propionate, cellulose acetate butyrate, ethylcellulose and the like; polyether resins such as polyformaldehyde, acetal copolymer, polyethylene oxide, polypropylene oxide, chlorinated polyether, phenoxy resin, polyphenylene oxide and the like; polycarbonates; polyesters; silicone resins; and hydroxyethyl acrylate, hydroxyethyl methacrylate or glycidyl methacrylate copolymer resins.

The vinyl alcohol resins have drawbacks that their good gas barrier property is impaired by water vapor and that their extrudability is inferior to that of polyolefin resins. In order to alleviate these drawbacks, there can be adopted a method of grafting a polyethylene having a low concentration of hydroxyl groups. The vinyl alcohol resins include a polyvinyl alcohol, an ethylene-vinyl alcohol copolymer, etc. As to the polyvinyl alcohol, a wholly or partially saponified product having at least 20% by weight of hydroxyl groups is preferred. A polyvinyl alcohol having a hydroxyl group concentration lower than that has no sufficient gas barrier property. The hydroxyl group concentration is more preferably at least 30% by weight, particularly preferably at least 38% by weight for excellent gas barrier property. In order to obtain good gas barrier property and good processability, it is preferable that the polyvinyl alcohol be mixed with a polyolefin resin in a volume fraction of 20–80% and that the viscosities of the two polymers be not different by more than 10 times at the processing temperature.

The ethylene-vinyl alcohol copolymer may be regarded as a resin in which the extrudability and water resistance of polyvinyl alcohol are improved. An ethylene-vinyl alcohol copolymer having 20–30% by weight of hydroxyl groups is used. An ethylene-vinyl alcohol copolymer having a hydroxyl group concentration lower than that has very low gas barrier property. Accordingly, when further improvements are desired in water resistance and processability, there can be used a method of grafting a polyethylene having a low concentration of hydroxyl groups. The polyolefin resin used in this case is preferably a completely or partially saponified ethylene-vinyl acetate copolymer having 0.01–20% by weight of hydroxyl groups. When the hydroxyl group concentration is lower than that, no sufficient compatibility is obtained. When the hydroxyl group concentration is higher than that, neither water resistance nor extrudability is sufficient. The polyolefin resin is more preferably a completely or partially saponified ethylene-vinyl acetate copolymer having 0.1–5% by weight of hydroxyl groups.

In the compatibilization of resins according to the present invention, it is preferable to use a vinyl alcohol resin as the polymer B and a polyolefin resin as the polymer A.

Polysaccharide plastics such as starch are useful as biodegradable resins but, as compared with polyolefin resins, have poor extrudability. This can be improved, as in the above-mentioned case of vinyl alcohol resins, by a method of grafting a polyethylene having a low concentration of hydroxyl groups.

The starch usable includes starches of potatoes, rice, tapioca, corn, beans, rye, wheat, etc., or physical or chemical modifications thereof. Plasticizers are often used for the resins having hydroxyl groups, and they can be used also in the present method.

The plasticizers are, for example, polar solvents such as polyhydric alcohol or ester thereof (e.g. poly-ethylene glycol, glycerol, sorbitol, erythritol, propylene glycol, pentaerythritol or glycerol ester), water, dimethyl sulfoxide and dimethylformamide.

The hydroxyl group concentration of each resin used in the present invention has no particular restriction. However, too low a hydroxyl group concentration gives no sufficient compatibilization. Preferably, each of the polymers A and B has at least 0.01% by weight of hydroxyl groups.

Preferably, the hydroxyl group concentration of the polymer A is lower than that of the polymer B for efficiently carrying out grafting. This is necessary for efficient diffusion of boric acid ester from inside the polymer A into the polymer B in the second step.

The molecular weight of each resin having hydroxyl group(s), usable in the present invention has no particular restriction. However, the two polymers A and B preferably have similar viscosities so that the boundary of the two polymers is renewed most efficiently during the kneading in the second step. The similar viscosities are not required when a special dispersion state is needed between the two polymers as in many polymer alloys.

The boron compound usable in the present invention has no particular restriction as long as it can react with hydroxyl group(s) to form an boric acid ester.

The boron compound can be exemplified by boric acid, borax, other metal borates and boric acid organic esters (e.g. methyl borate, ethyl borate, propyl borate, butyl borate and phenyl borate).

The boron compound is preferably used in the form of a solution dissolved in an appropriate solvent, for improved dispersion. The solution includes, for example, an aqueous boric acid solution, an alcoholic boric acid solution and a toluene or xylene solution of a boric acid organic ester. An aqueous solution is preferable industrially, but the aqueous solution preferably has a controlled pH for suppressing the gelation and/or deterioration of resins. When there is used, for example, a polyvinyl alcohol or an ethylene-vinyl alcohol copolymer, an aqueous borax solution is preferred to an aqueous boric acid solution.

The boron compound solution is preferably an organic solvent solution of a boric acid organic ester.

The amount of the boron compound usable in the present invention has no particular restriction, but is preferably 1 mole % or more relative to the total hydroxyl group amount in the polymer A or B having a lower hydroxyl group concentration and 100 mole % or less relative to the total hydroxyl group amount in the polymers A and B. When the boron compound amount is smaller than that, no sufficient compatibilization is obtained; when the amount is larger than that, the portion of the boron compound not participating in the reaction remains in the system. More preferably, the boron compound amount is 1 mole % or more relative to the total hydroxyl group amount in the polymer A or B having a lower hydroxyl group concentration and 50 mole % or less relative to the total hydroxyl group amount in the polymers A and B. Particularly preferably, the boron compound amount is 1–50 mole % relative to the total hydroxyl group amount in the polymer A or B having a lower hydroxyl group concentration.

Even when severe gelation occurs in the first step, there are cases where the crosslinking structure formed in the first step is disintegrated in the second step and a preferable resin composition is obtained finally. Therefore, the degree of gelation in the first step does not determine the upper limit of the amount of the boron compound used.

The reason why the boric acid ester bond is introduced in the present invention, is that the bond is a reversible bond and can diffuse into polymers having hydroxyl group(s). Hence, when a boric acid ester bond is introduced into one component resin beforehand and the resin is blended with other component resin, a graft polymer is formed at the boundary of the two resins via the boric acid ester bond, in the course of diffusion of boric acid ester into the other component resin, whereby a resin composition comprising resins highly compatibilized with each other is obtained.

The present resin composition obtained by the present method can be used as a molding resin material having properties possessed by a plurality of resins, such as excellent processability (e.g. excellent melt tension and melt elongation), excellent heat stability and the like. Also, the resin composition can be made into a film, a sheet, a fiber, a molded article, a laminate, etc. having excellent impact resistance, heat resistance, abrasion resistance, corrosion resistance, durability, gas barrier property, etc. Further, the resin composition can be used as a resin additive (e.g. compatibility improver or resin modifier) or an adhesive.

DESCRIPTION OF PREFERRED EMBODIMENTS

The present invention is hereinafter described in more detail by way of Examples. However, the present invention is not restricted thereto.

EXAMPLE 1

Compatibilization of a polyvinyl alcohol (PVA) and a polyethylene was tried. Hydroxyl group introduction into polyethylene was conducted by copolymerizing ethylene and a very small amount of vinyl acetate to obtain an ethylene-vinyl acetate copolymer (MI=0.5, vinyl acetate content=5% by weight) and subjecting the copolymer to in-extruder saponification according to the procedure described in M. LAMBLA, J. DRUZ, A. BOUILLOUX, POLYMER ENGINEERING SCIENCE, VOL. 27, p. 1221, 1987, to obtain an ethylene-vinyl alcohol copolymer (a modified EVA) (MI=0.5, vinyl alcohol content=0.9% by weight, saponification degree=87%). To the ethylene-vinyl alcohol copolymer being heat-kneaded at 150° C. in the extruder was added 14 parts by weight (15 mole % as boric acid relative to the hydroxyl groups introduced into the ethylene-vinyl acetate copolymer) of a 4% aqueous boric acid solution. The mixture was sufficiently kneaded with steam being removed, to allow a boric acid ester-induced crosslinking reaction to proceed. The reaction mixture was melt-kneaded with a polyvinyl alcohol (polymerization degree=300, saponification degree=98.5%) at a 1/1 volume ratio using a biaxial extruder (temperature=240° C., residence time= about 1 minute).

EXAMPLES 2 AND 3

The procedure of Example 1 was repeated with the exception that the 4% aqueous boric acid solution was used in an amount shown in Table 1. The results are shown in Table 1.

EXAMPLES 4–7

The procedure of Example 1 was repeated with the exception that the 4% aqueous boric acid solution was used in an amount shown in Table 1 and the extruder temperature was 170° C. The results are shown in Table 1.

EXAMPLE 8

The procedure of Example 6 was repeated with the exception that the aqueous boric acid solution was changed to an aqueous sodium borate solution of the same boron concentration. The results are shown in Table 1.

EXAMPLE 9

The procedure of Example 8 was repeated with the exception that the PVA was changed to corn starch plasticized with 60 parts by weight of diglycerine, the corn starch was used in an amount of 50% by weight, and extrusion was conducted at 200° C. The results are shown in Table 1.

EXAMPLES 10–12

The procedure of Example 8 was repeated with the exception that an ethylene-vinyl alcohol copolymer having an ethylene content of 32 mol % in an amount of those shown in Table 2 was used instead of PVA.

EXAMPLES 13–15

The procedures of Examples 10–12 were repeated with the exception that an ethylene-vinyl alcohol copolymer having an ethylene content of 44 mol % in an amount of those shown in Table 2 was used.

Comparative Example 1

The procedure of Example 1 was repeated with the exception that no aqueous boric acid solution was used. The results are shown in Table 1.

Comparative Example 2

The procedure of Comparative Example 1 was repeated with the exception that the extrusion temperature was 170° C.

Comparative Example 3

The procedure of Example 9 was repeated with the exception that no aqueous sodium borate solution was used. The results are shown in Table 1.

Comparative Example 4–6

The procedure of Example 10–12 was repeated with the exception that no aqueous sodium borate solution was used. The results are shown in Table 1.

Comparative Example 7–9

The procedure of Example 13–15 was repeated with the exception that no aqueous sodium borate solution was used. The results are shown in Table 1.

As is clear from Table 1 and 2 each of the resin compositions obtained in Examples 1–15 had excellent melt elongation or excellent melt tension. Meanwhile, each of the resin compositions obtained in Comparative Examples 1–9 was inferior in melt elongation or melt tension.

TABLE 1

| | Amount of 4% aqueous boric acid solution Weight parts (mole %*3) | Processability*1 | |
|---|---|---|---|
| | | Melt elongation (mm/min) | Melt tension (gf) |
| Example 1 | 14 (15) | 81.1 | 4.1 |
| Example 2 | 28 (30) | 80.1 | 5.0 |
| Example 3 | 42 (45) | 71.1 | 6.0 |
| Example 4 | 11 (12) | 48.4 | 2.8 |
| Example 5 | 15 (16) | 151.6 | 2.0 |
| Example 6 | 21 (22) | 157.2 | 2.2 |
| Example 7 | 23 (25) | 177.1 | 2.3 |
| Example 8 | 21 (22) | 159.3 | 2.5 |
| Example 9*2 | 30 (32) | 8.2 | 30.0 |
| Comparative Example 1 | 0 (0) | 4.6 | 4.7 |
| Comparative Example 3*2 | 0 (0) | <1 | — |

*1 An off-take speed at which spinning is possible, i.e. a melt elongation, and a tension applied to a yarn at that time. A larger melt elongation gives faster processing, and a larger melt tension gives higher parison stability during blow molding, higher bubble stability during inflation molding and lower drawdown during T-die molding.
Tester: Capirograph manufactured by Toyo Seiki Co.
Test conditions: 240° C.
Orifice: 16.75 mm–2.095 mm in diameter
Piston speed: 5 mm/min
*2 Melt elongation and tension were measured at 180° C. The other conditions were the same as in *1.
*3 Mole % of boric acid relative to the hydroxyl group(s) introduced into ethylene-vinyl acetate copolymer.

TABLE 2

| | Ethylene-vinyl alcohol copolymer weight % (volume %) | Processability | |
|---|---|---|---|
| | | Melt elongation (mm/min) | Melt tension (gf) |
| Example 10 | 69 (63) | 28.9 | 14.5 |
| Example 11 | 75 (70) | 35.8 | 13.3 |
| Example 12 | 84 (80) | 55.7 | 11.1 |
| Example 13*4 | 57 (52) | 10.9 | 26.4 |
| Example 14*4 | 67 (62) | 12.9 | 22.0 |
| Example 15*4 | 76 (72) | 19.1 | 19.4 |
| Comparative Example 4 | 69 (63) | 13.2 | 4.2 |

TABLE 2-continued

| | Ethylene-vinyl alcohol copolymer weight % (volume %) | Processability | |
|---|---|---|---|
| | | Melt elongation (mm/min) | Melt tension (gf) |
| Comparative Example 5 | 75 (70) | 49.2 | 3.6 |
| Comparative Example 6 | 84 (80) | 46.3 | 2.9 |
| Comparative Example 7*4 | 57 (52) | 14.2 | 7.5 |
| Comparative Example 8*4 | 67 (62) | 14.0 | 2.5 |
| Comparative Example 9*4 | 76 (72) | 30.6 | 1.3 |

*4 Melt elongation and Melt tension at 220° C.
The others are identical with those in *1.

For some of the resin compositions obtained in the above Examples and Comparative Examples, the dispersion conditions of PVA phase and modified EVA phase were observed using an electron microscope. The results are shown in Table 3.

TABLE 3

| | Sea phase | Island phase | Av. dia. of dispersed particles (μm)*5 |
|---|---|---|---|
| Example 4 | PVA | Mod. EVA | 15 |
| Example 5 | PVA | Mod. EVA | 5 |
| Example 6 | Mod. EVA | PVA | 5 |
| Example 7 | Mod. EVA | PVA | 5 |
| Example 8 | PVA | Mod. EVA | 3 |
| Comparative Example 2 | PVA | Mod. EVA | 30 |

*5 A smaller average diameter of dispersed particles indicates higher compatibility.

EXAMPLES 16–20

The procedure of Example 8 was repeated with the exception that the PVA was used in a volume fraction shown in Table 4. Each of the resulting resin compositions was molded into a film of 20 μm in thickness by an inflation method at a die temperature of 240° C. at an off-take speed of 20 m/min at a blow-up ratio of 4. Each film obtained was measured for oxygen permeability and water vapor permeability, and the results are shown in Table 4.

Comparative Examples 10–14

Resin compositions were obtained in the same procedures as in Examples 16–20 with the exception that no boron compound was used. They had poor processability and their molding was impossible.

EXAMPLES 21–23

The compositions of Examples 10–12 containing an ethylene-vinyl alcohol copolymer (which is abbreviated as EVOH-F in Table 4) having an ethylene content of 32 mol % were molded into film as in Examples 16–20.

EXAMPLES 24–26

The compositions of Examples 13–15 containing an ethylene-vinyl alcohol copolymer (which is abbreviated as EVOH-E in Table 4) having an ethylene content of 44 mol % were molded into film through the same procedure of Examples 16–20 with the exception that the die temperature was maintained at 220° C.

Comparative Examples 15–17

The resin compositions of Examples 4–6, which were produced by the same procedure of Examples 10–12 with the exception that boron compound was not used, had a poor processability and their molding was impossible.

Comparative Examples 18–20

The resin compositions of Examples 7–9, which were produced by the same procedure of Examples 13–15 with the exception that boron compound was not used, had a poor processability and their molding was impossible.

Comparative Example 21

Only the ethylene-vinyl alcohol copolymer resin used in Examples 21–23 was molded under the same conditions.

Comparative Example 22

Only the ethylene-vinyl alcohol copolymer resin used in Example 24–26 was molded under the same conditions.

TABLE 4

| | Polyvinyl alcohol type resin | (vol. %) | Oxygen permeability (cc/m² day atm)*6 | Water vapor permeability (g/m² day)*7 |
|---|---|---|---|---|
| Example 16 | PVA | 50 | 0.06 | 440 |
| Example 17 | PVA | 45 | 0.07 | 260 |
| Example 18 | PVA | 40 | 0.1 | 150 |
| Example 19 | PVA | 35 | 0.8 | 125 |
| Example 20 | PVA | 30 | 3.8 | 100 |
| Example 21 | EVOH-F | 63 | 2.8 | 110 |
| Example 22 | EVOH-F | 70 | 1.3 | 102 |
| Example 23 | EVOH-F | 80 | 0.9 | 135 |
| Example 24 | EVOH-E | 52 | 21 | 72 |
| Example 25 | EVOH-E | 62 | 12 | 93 |
| Example 26 | EVOH-E | 72 | 8.8 | 92 |
| Comparative Example 21 | EVOH-F | 100 | 0.5 | 252 |
| Comparative Example 22 | EVOH-E | 100 | 2.5 | 129 |

*6 oxygen permeability?
Tester: OX-TRAN 10/50A manufactured by MOCON Co.
Test conditions: 30° C., dry
*7 Water vapor permeability
Tester: PN 140-052 manufactured by MOCON Co.
Test conditions: 40° C., difference in relative humidity = 90%

EXAMPLES 27–30

Resin compositions were obtained in the same procedure as in Example 8 with the exception that part of the PVA used in Example 8 was replaced by a PVA of higher molecular weight (polymerization degree=500, saponification degree= 98.5%) of an amount shown in Table 5. Each of the resin compositions was molded into a film by an inflation method under the same conditions as in Example 16–20. Each film was measured for oxygen permeability and water vapor permeability. The results are shown in Table 5.

Comparative Examples 23–26

Resin compositions were obtained in the same procedures as in Examples 27–30 with the exception that no boron compound was used. They had poor processability and their molding was impossible.

TABLE 5

|  | Amount of higher molecular PVA (vol. %) | Oxygen permeability (cc/m² day atm)*6 | Water vapor permeability (g/m² day)*7 |
| --- | --- | --- | --- |
| Example 27 | 0 | 0.06 | 440 |
| Example 28 | 25 | 0.04 | 140 |
| Example 29 | 50 | 1.4 | 110 |
| Example 30 | 75 | 3.2 | 110 |

*6 Same explanation as in Table 4.
*7 Same explanation as in Table 4.

What is claimed is:

1. A method for compatibilizing at least two different thermoplastic resins with each other, each said thermoplastic resin having hydroxyl group(s), wherein said at least two thermoplastic resins are selected from the group consisting of an ethylene-vinyl alcohol copolymer and a polyvinyl alcohol, wherein one of the at least two thermoplastic resins has 20–60% by weight of hydroxyl group(s) and the other is a thermoplastic resin having 0.01–5% by weight of hydroxyl group(s), which method comprises reacting at least one of said thermoplastic resins with a boron compound simultaneously with or before mixing of said resins, to form a boric acid ester at least at the boundary of said resin; and removing water formed during said reaction under kneading conditions.

2. A method according to claim 1, wherein the reacting occurs before mixing of said resins.

3. A method for compatibilizing at least two thermoplastic resins with each other, each said resin having hydroxyl group(s), wherein one of the at least two thermoplastic resins has 10–60% by weight of hydroxyl group(s) and the other is a thermoplastic resin having 0.01–5% by weight of hydroxyl group(s), which method comprises reacting at least one of said thermoplastic resins with a boron compound simultaneously with or before mixing of said resins, to form a boric acid ester at least at the boundary of said resins; and removing water formed during said reaction under kneading conditions.

4. A method according to claim 3, wherein the boron compound is boric acid, a metal borate or a boric acid organic ester compound.

5. A method according to claim 3, wherein the at least one thermoplastic resin to be reacted with a boron compound is resin(s) other than a resin having the highest hydroxyl group concentration.

6. A method according to claim 3, wherein said reacting occurs before mixing said resins.

7. A method according to claim 3, wherein the one of the at least two thermoplastic resins has 20–60% by weight of hydroxyl group(s) and the other is a thermoplastic resin having 0.01–5% by weight of hydroxyl group(s).

8. A resin composition comprising resins compatibilized with each other, obtained by a method according to any of claims 4, 5, 1 and 2, 3, 6, 7.

9. A laminate whose at least one layer consists of a resin composition comprising resins compatibilized with each other, obtained by a method according to any of claims 4, 1 and 2, 3, 6, 7.

* * * * *